Figure 1:
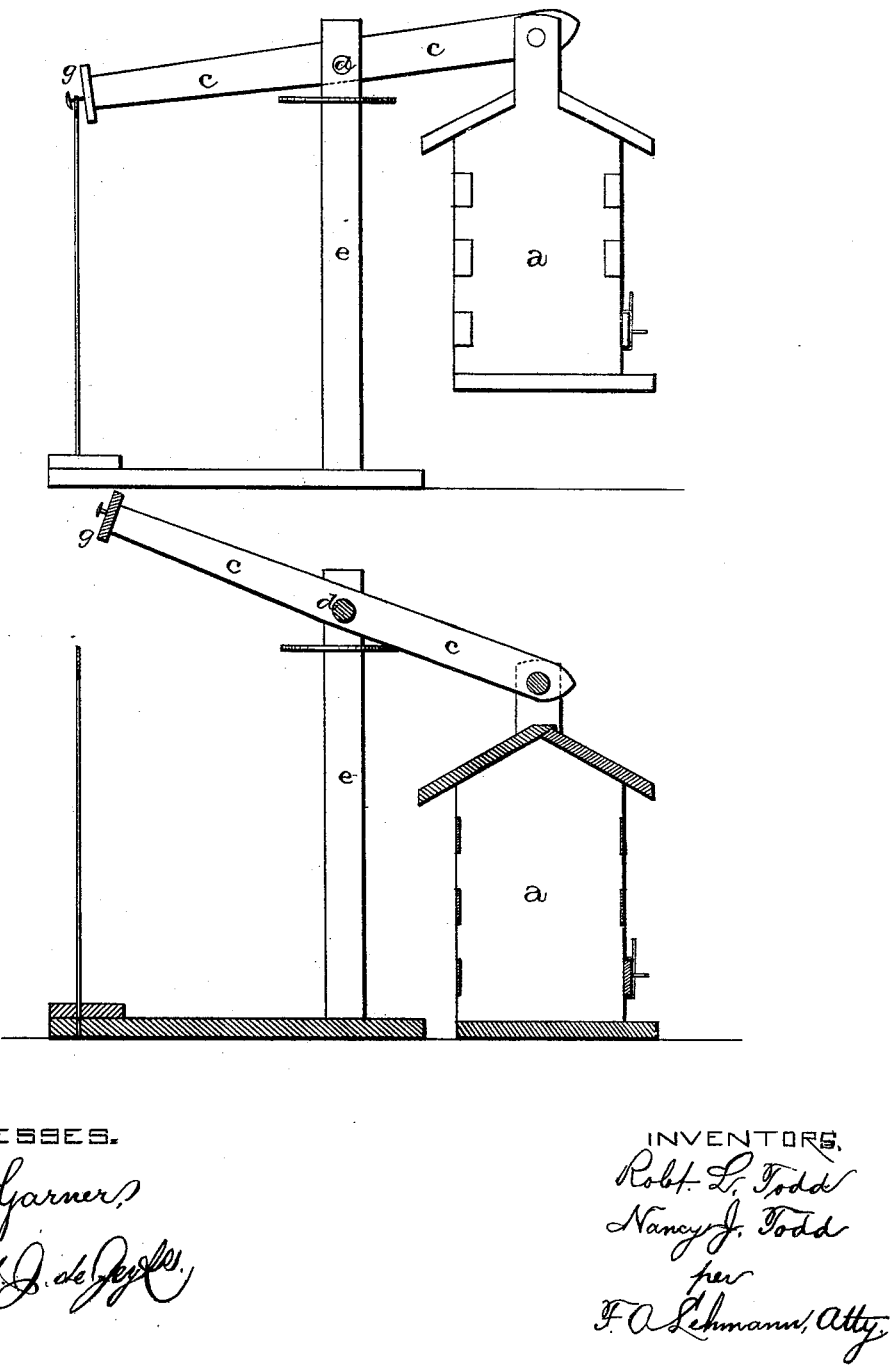

R. L. & N. J. TODD.
CHICKEN COOP.

No. 191,556. Patented June 5, 1877.

WITNESSES.
Wm Garner
Albert J. de Gex

INVENTORS.
Robt. L. Todd
Nancy J. Todd
per
F. A. Lehmann, Atty.

UNITED STATES PATENT OFFICE.

ROBERT L. TODD AND NANCY J. TODD, OF SHAMROCK, MISSOURI.

IMPROVEMENT IN CHICKEN-COOPS.

Specification forming part of Letters Patent No. 191,556, dated June 5, 1877; application filed April 14, 1877.

*To all whom it may concern:*

Be it known that we, ROBERT L. TODD and NANCY JANE TODD, of Shamrock, in the county of Callaway and State of Missouri, have invented certain new and useful Improvements in Chicken-Coops; and we do hereby declare the following to be a full, clear, and exact description of the invention, such as will enable others skilled in the art to which it pertains to make and use it, reference being had to the accompanying drawings, which form part of this specification.

Our invention relates to an improvement in chicken-coops; and it consists in attaching the coop to suitable pivoted levers, whereby the coop can be raised above the ground, so as to keep young chickens from being drowned by heavy or long-continued rains, and from being destroyed by animals that prey upon them, as will be more fully described hereinafter.

The accompanying drawings represent our invention.

*a* represents a chicken-coop of an desired form or construction, and which is pivoted or otherwise connected at its top to the two levers *c*. These levers are pivoted upon the cross-bar *d*, which extends from one standard, *e*, to the other at a suitable distance above the ground. The rear ends of the levers *c* are united together by the cross-bar *g*, from the center of which projects a pin, stud, or hook, over which a rope, wire, chain, or other similar device catches so as to hold the levers in such a position as will raise the coop above the earth, and thus keep the young chickens from being drowned from floods or rains, and from being destroyed by animals that prey upon them.

If so desired, a different arrangement of the parts may be made without departing from the spirit of our invention, as our whole object is use of a simple combination by which the coop can be easily and readily raised and lowered at will.

Having thus described our invention, we claim—

The combination of the coop *a*, levers *c*, standards *e*, bar *g*, and a holding device, substantially as specified.

In testimony that we claim the foregoing we have hereunto set our hands this 30th day of March, 1877.

ROBERT L. TODD.
NANCY J. TODD.

Witnesses:
B. D. BROWN,
KATE BROWN.